Figure 1:
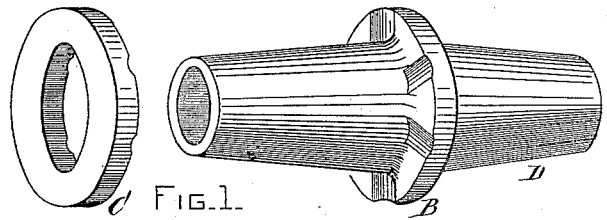

(No Model.) 2 Sheets—Sheet 1.

O. C. HALL & E. RASMUSSEN.
METALLIC WHEEL.

No. 452,840. Patented May 26, 1891.

WITNESSES
Thos. F. Courey
Wm. H. Capel

INVENTORS
ORLANDO C. HALL
EINAR RASMUSSEN

By H. C. Townsend
Atty (No Model.) 2 Sheets—Sheet 2.

O. C. HALL & E. RASMUSSEN.
METALLIC WHEEL.

No. 452,840. Patented May 26, 1891.

WITNESSES
Thos. F. Courey
Wm. H. Capes

INVENTORS
ORLANDO C. HALL,
EINAR RASMUSSEN.
By H. L. Townsend
Atty.

UNITED STATES PATENT OFFICE.

ORLANDO C. HALL, OF BOSTON, AND EINAR RASMUSSEN, OF LYNN, MASSACHUSETTS, ASSIGNORS TO THE THOMSON ELECTRIC WELDING COMPANY, OF MAINE.

METALLIC WHEEL.

SPECIFICATION forming part of Letters Patent No. 452,840, dated May 26, 1891.

Application filed August 14, 1890. Serial No. 362,001. (No model.)

*To all whom it may concern:*

Be it known that we, ORLANDO C. HALL, a citizen of the United States, and a resident of Boston, in the county of Suffolk and State of Massachusetts, and EINAR RASMUSSEN, a subject of the King of Norway and Sweden, and a resident of Lynn, county of Essex, Massachusetts, have invented certain new and useful Metallic Wheels, of which the following is a specification.

Our invention relates to the construction of metallic wheels; and its object is to produce a wheel which shall be cheap, rigid, strong, and durable.

It has heretofore been proposed to make wheels of metal, and in the usual form of construction the spokes have been upset or screwed into place on a cast-iron hub. This construction is not only a difficult one in manufacture, but the imposition of heavy strains on the metal is apt to impair its strength. In the construction where the spokes are screwed into place the ends of the screw-threads are liable to strip or the ends work loose when subjected to rough usage.

Our invention consists, essentially, of a metallic wheel having a wheel-hub box provided with a flange or projection having suitable spoke grooves or sockets, in combination with sleeves, collars, or disks fitting upon said wheel or box and welded together and to the spokes in place between them.

Our invention consists, also, of a metallic wheel having a hub-box provided with a flange, spokes fitting into spoke grooves or sockets in said flange, and a collar fitting on the hub-box and welded to the flange and spokes.

Our invention consists, further, in certain features of construction, and particularly in the construction of a metallic wheel which has two rows or sets of spokes, as hereinafter more particularly described and claimed.

In the preferred construction of wheel embodying our invention the collars or sleeves which grasp the spokes between them and are welded together are exterior to a supplemental collar, which holds the spokes in the spoke grooves or sockets formed in or on the flange projecting from the hub-box. It would, however, be within our invention to dispense with such interior collar and to depend upon the sleeves or collars which are welded to one another and grasp the spokes between them for holding the spokes in place in the grooves or sockets. The collars, bands, or shells which are welded to one another and to the spokes in position between them are provided with suitable grooves in which the spokes are received.

Figure 5:
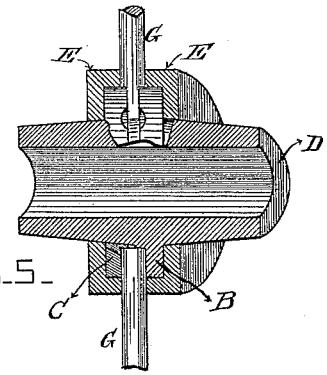
Figure 6:
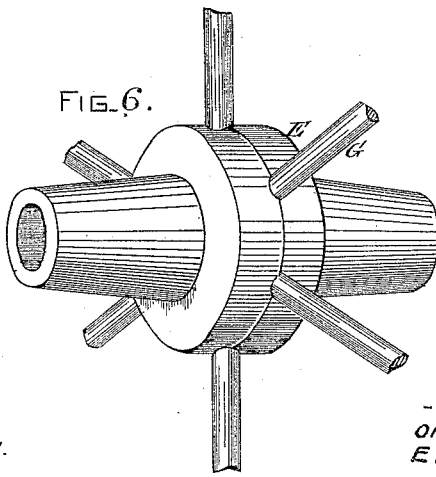
Figures 7, 8, 9:
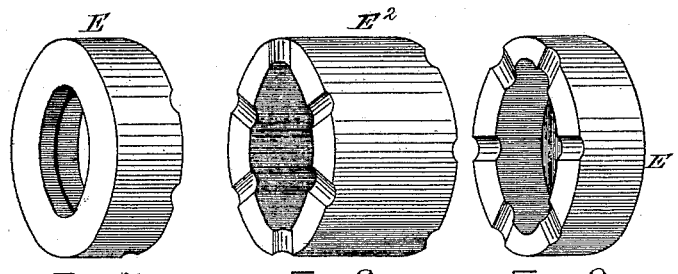
Figure 10:
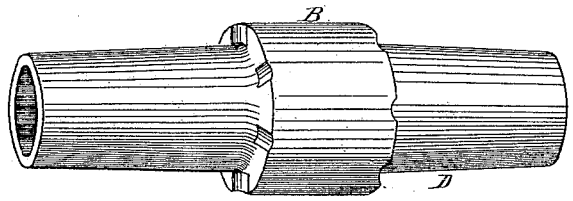
Figure 11:
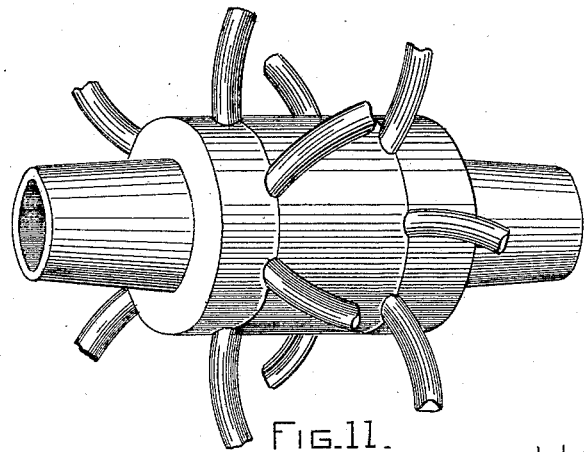

In the accompanying drawings, Figures 1, 2, 3, and 4 illustrate various parts of a hub made in accordance with our invention. Fig. 5 is a part cross-section of a finished hub. Fig. 6 shows in perspective a finished hub made from the parts illustrated in Figs. 1 to 4, inclusive. Figs. 7, 8, and 9 show various parts adapted for use in making a wheel having two rows of spokes. Fig. 10 shows the hub-box having a flange for use in connection with the parts shown in Figs. 7, 8, and 9. Fig. 11 is a perspective view of the hub portion of a finished wheel made from the parts in Figs. 7 to 10.

Referring to Fig. 1, D indicates a wheel-hub box, preferably of cast-iron or some other suitable cheap material, having a flange or collar B cast or forged in one piece with said box or permanently fastened thereto. The flange B is provided with suitable spoke grooves or sockets to receive the spokes. C indicates a collar, which is adapted to fit upon the hub-box D and to come snugly up against the flange B, with the spokes in position between the flange and collar and resting in the grooves or sockets formed in the meeting faces of said collar and flange.

Figure 2:
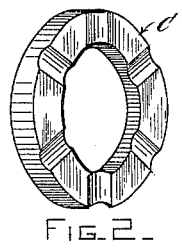
Figure 3:
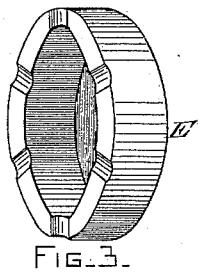
Figure 4:
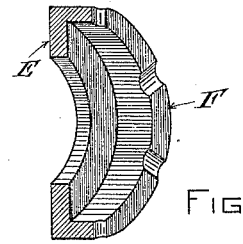

Fig. 2 shows in perspective the face of the collar which has the spoke-grooves which act in connection with the grooves on the flange B. E E indicate two collars, bands, or shells, which also fit upon the box D, and are provided with horizontal flanges F, adapted to abut against one another over the flange B and with the spokes G resting in grooves or notches formed in the flanges F. These flanges may be formed on one or both of the collars and embrace the flange B, with the spokes in place thereon. The spokes themselves may be formed in any manner known in the art. The collars E may be drop forgings of soft iron, steel, or other suitable metal.

The spokes having been placed in position in the sockets or grooves in the flange B and the collar C applied, the collars E are applied over the box D and their edges abutted against one another and against the spokes, so as to grasp the latter on opposite sides. The parts are then welded together, by the electric welding process, by passing a heavy electric current through the parts from one collar E to the other, so as to heat the abutting parts to plasticity and then applying end pressure to force the parts together and weld them to one another. By this procedure the collars, spokes, and flange are forced into very close relation with each other and fastened firmly together, the spokes becoming welded to the metal collars E, and the collars themselves being also welded together around the flange B.

It is obvious that the use of the collar C might be dispensed with when other devices are employed for holding the spokes in place against lateral displacement from the spoke-grooves or flange or collar B. We prefer, however, to employ the additional collar C, as indicated.

In the remaining figures of the drawings we have illustrated our invention as applied to a wheel wherein two rows of spokes are employed and the additional collar C is omitted.

Fig. 10 shows the box D as provided with a flange or collar B, having spoke-grooves at its opposite edges adapted to receive the two rows of spokes, as indicated in Fig. 11. E E are the collars, which are similar to those before described and which slip upon the hub-box D. $E^2$ is a collar having the spoke-grooves indicated and adapted to slip over the flange or collar B. The width of the collar $E^2$ is a little greater than that of the flange B. The collar $E^2$ having been applied upon the flange B, the spokes are put into position in the notches in the flange B and in the collar $E^2$, after which the exterior collars E are slipped upon the hub and brought into position against the spokes and into abutment with the collar $E^2$. After this the electric-welding operation before described is resorted to and the collars or sections of hub E $E^2$ finally welded together and to the spokes grasped between them, the whole being held from turning in this case upon the box P by the engagement of the spokes with the spoke-grooves in the flange B.

In constructing a wheel such as illustrated in Fig. 5 the volume of the electric current employed will to some extent determine the extent to which the parts shall be welded together. The principal welding may be produced between the parts E E, though it may be of course extended so as to include the interior collars C. The principal office, however, of the parts B C is to hold the whole structure against moving upon the hub-box D, while the exterior collars E give strength and rigidity to the whole structure.

What we claim as our invention is—

1. In a metallic wheel, the combination, with the wheel-hub box provided with a flange having spoke grooves or sockets, of two collars fitting on said box and welded together and to the spokes grasped between them.

2. In a metallic wheel, the combination, with the wheel-hub box having a flange provided with spoke-grooves, of a collar fitting on said box and holding the spokes in the grooves, and exterior collars having horizontal flanges welded together and to the spokes grasped between them, as and for the purposes described.

3. A metallic wheel having a wheel-hub box provided with a flange, spokes resting in grooves in said flange, and two collars abutted against one another over said flange and welded together and to the spokes, as and for the purpose described.

4. In a metallic wheel, a hub-box having a flange provided with spoke-grooves, spokes resting in said grooves, and a collar for holding the spokes in the grooves, said collar, flange, and spokes being all welded together, as and for the purpose described.

5. In a metallic wheel, the combination of a wheel-hub box having a flange or collar integral with it and provided with spoke-grooves, and two collars grasping the spokes at opposite sides outside said flange and welded together and to the spokes, as and for the purpose described.

6. In a metallic wheel, a hub having a flange provided with spoke grooves or notches at its opposite ends, a collar fitting over said flange, and two collars fitting upon the hub-box at opposite sides of said flange and welded to the first-named collar and to the spokes, as and for the purpose described.

Signed at Lynn, in the county of Essex and State of Massachusetts, this 11th day of August, A. D. 1890.

ORLANDO C. HALL.
EINAR RASMUSSEN.

Witnesses:
JOHN W. GIBBONEY,
WARREN B. LEWIS.